(12) United States Patent
Hellyer-Kinch

(10) Patent No.: US 9,944,058 B2
(45) Date of Patent: Apr. 17, 2018

(54) METHOD OF MAKING AN AIRDAM

(71) Applicant: GE Aviation Systems Limited, Cheltenham, Gloucestershire (GB)

(72) Inventor: James Hellyer-Kinch, Southhampton (GB)

(73) Assignee: GE Aviation Systems Limited, Cheltenham, Gloucestershire (GB)

( * ) Notice: Subject to any disclaimer, the term of this patent is extended or adjusted under 35 U.S.C. 154(b) by 0 days.

(21) Appl. No.: 15/117,224

(22) PCT Filed: Feb. 6, 2015

(86) PCT No.: PCT/EP2015/052558
§ 371 (c)(1),
(2) Date: Aug. 8, 2016

(87) PCT Pub. No.: WO2015/118130
PCT Pub. Date: Aug. 13, 2015

(65) Prior Publication Data
US 2016/0347046 A1    Dec. 1, 2016

(30) Foreign Application Priority Data
Feb. 10, 2014    (GB) .................................. 1402229.7

(51) Int. Cl.
B32B 37/00    (2006.01)
B32B 37/10    (2006.01)
(Continued)

(52) U.S. Cl.
CPC .......... B32B 37/1018 (2013.01); B29C 53/52 (2013.01); B29C 70/54 (2013.01);
(Continued)

(58) Field of Classification Search
CPC ....... B32B 37/20; B32B 37/203; B32B 38/10; B32B 37/10; B32B 37/1018;
(Continued)

(56) References Cited

U.S. PATENT DOCUMENTS 3,337,040 A * 8/1967 Brace, Jr. ............... B65D 75/30
206/447
4,311,661 A    1/1982 Palmer
(Continued)

FOREIGN PATENT DOCUMENTS

CN    86207216 U    3/1988
CN    101913285 A    12/2010
(Continued)

OTHER PUBLICATIONS

Great Britain Search Report and Written Opinion dated Jul. 31, 2014 which was issued in connection with GB Patent Application No. 1402229.7 which was filed on Feb. 10, 2014.
(Continued)

*Primary Examiner* — John Goff
(74) *Attorney, Agent, or Firm* — General Electric Company; William Scott Andes

(57) ABSTRACT

A method of making an airdam to be placed along the edge of a composite work piece during a curing process is disclosed. The method comprises forming a strip of peel ply, forming a strip of tacky putty, and automatically affixing the strip of tacky putty to the strip of peel ply without human assistance to form a laminate comprising at least one layer of peel ply and at least one layer of tacky putty.

16 Claims, 5 Drawing Sheets

(51) Int. Cl.
  *B32B 37/20* (2006.01)
  *B29C 70/54* (2006.01)
  *B32B 37/12* (2006.01)
  *B29C 53/52* (2006.01)
  *B65D 81/05* (2006.01)
  *B29L 9/00* (2006.01)
  *B29D 99/00* (2010.01)
  *B29C 53/36* (2006.01)

(52) U.S. Cl.
  CPC .............. *B32B 37/12* (2013.01); *B32B 37/20* (2013.01); *B65D 81/051* (2013.01); *B29C 2053/362* (2013.01); *B29D 99/0053* (2013.01); *B29L 2009/00* (2013.01); *B32B 2309/70* (2013.01); *B32B 2605/18* (2013.01)

(58) Field of Classification Search
  CPC . B29C 66/81455; B29C 70/44; B29C 70/443; B29C 2043/3644; B29C 66/00145
  USPC ................................ 156/201, 324, 285, 286
  See application file for complete search history.

(56) References Cited

U.S. PATENT DOCUMENTS

| | | | |
|---|---|---|---|
| 4,396,447 A * | 8/1983 | Firth | ........................ B29C 53/04 156/201 |
| 4,789,594 A * | 12/1988 | Stawski | ................... B26D 1/02 156/222 |
| 5,116,216 A | 5/1992 | Cochran et al. | |
| 5,123,985 A | 6/1992 | Evans et al. | |
| 2003/0183331 A1 * | 10/2003 | Ciambrone | ......... B32B 37/1018 156/285 |
| 2005/0126699 A1 * | 6/2005 | Yen | ....................... B29C 70/088 156/285 |
| 2013/0105072 A1 * | 5/2013 | Anderson | ............. B29C 70/526 156/264 |

FOREIGN PATENT DOCUMENTS

| | | |
|---|---|---|
| EP | 2676984 A1 | 12/2013 |
| KR | 200381695 Y1 | 4/2005 |
| WO | 0066424 A1 | 11/2000 |
| WO | 2005070642 A1 | 8/2005 |
| WO | 2006033016 A1 | 3/2006 |
| WO | 2010048122 A1 | 4/2010 |

OTHER PUBLICATIONS

International Search Report and Written Opinion dated Nov. 5, 2015 which was issued in connection with PCT Patent Application No. PCT/EP2015/052558 which was filed on Feb. 16 2015.

Great Britain Office Action issued in connection with GB Application No. 1402229.7 dated Aug. 4, 2016.

Unofficial English Translation of Chinese Office Action issued in Connection with Corresponding CN Application No. 201580008020.6 dated Mar. 22, 2017.

* cited by examiner

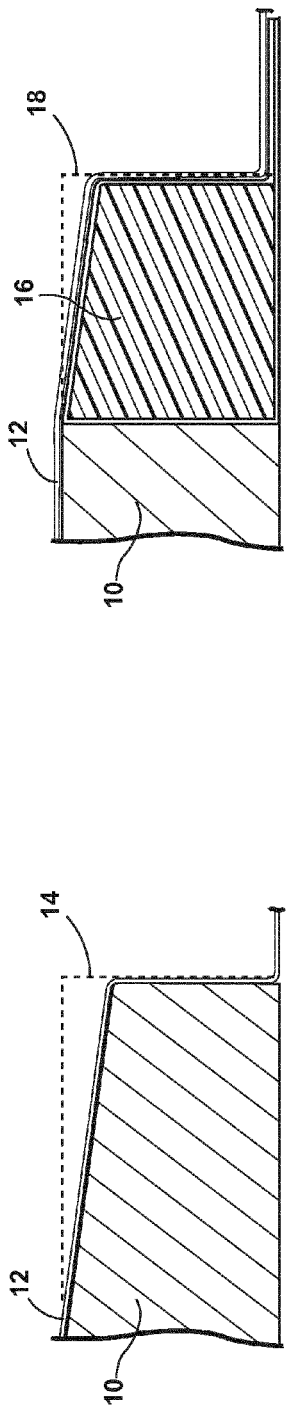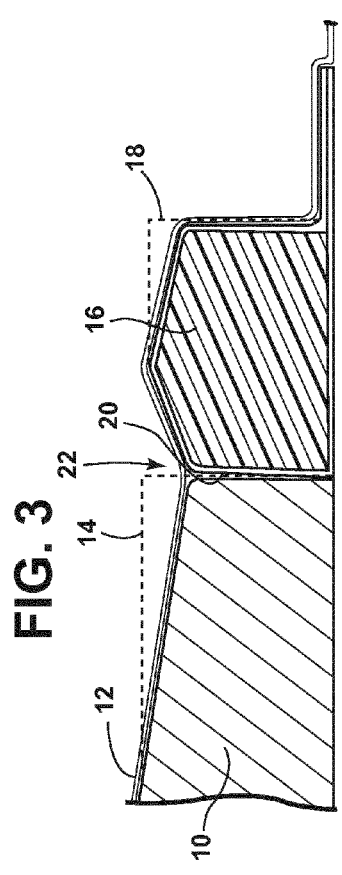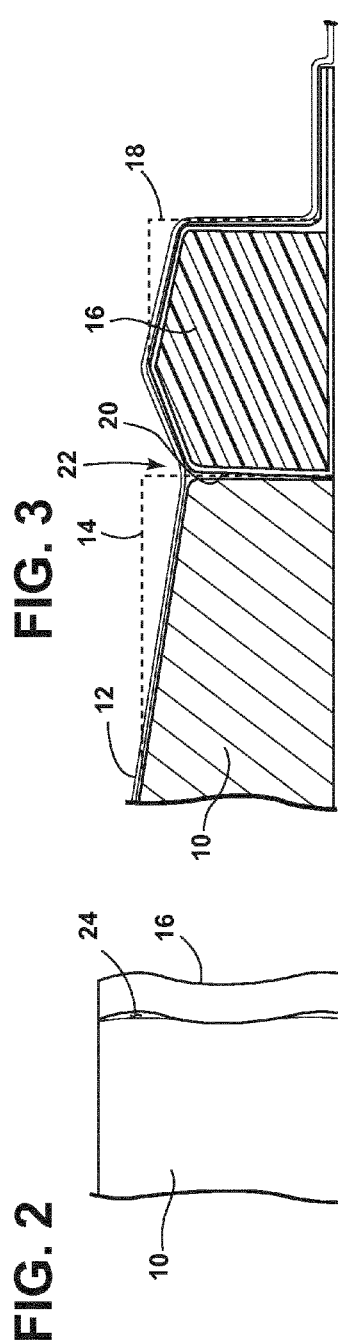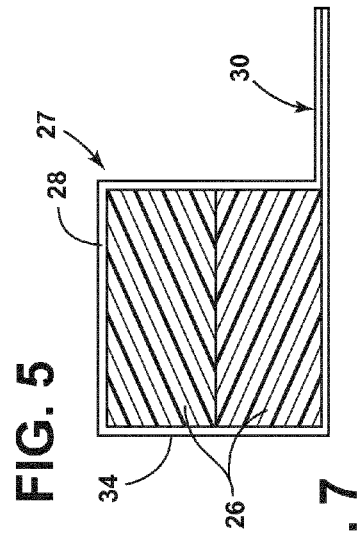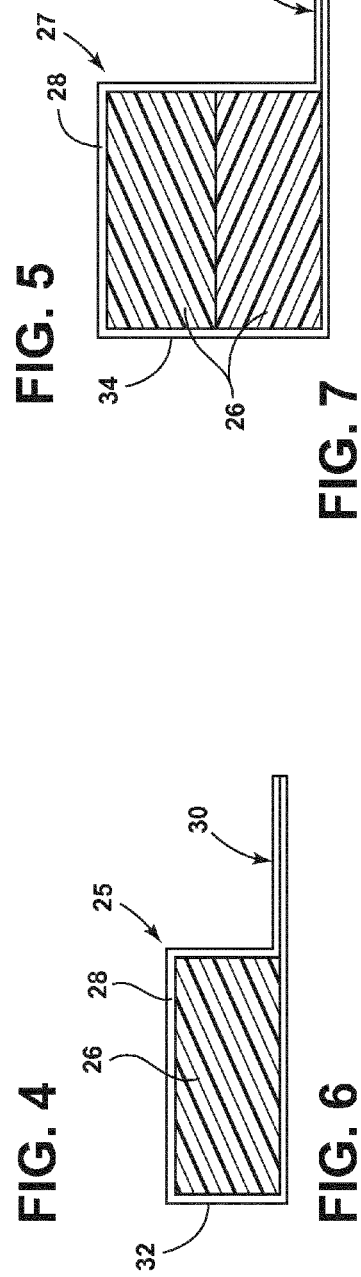

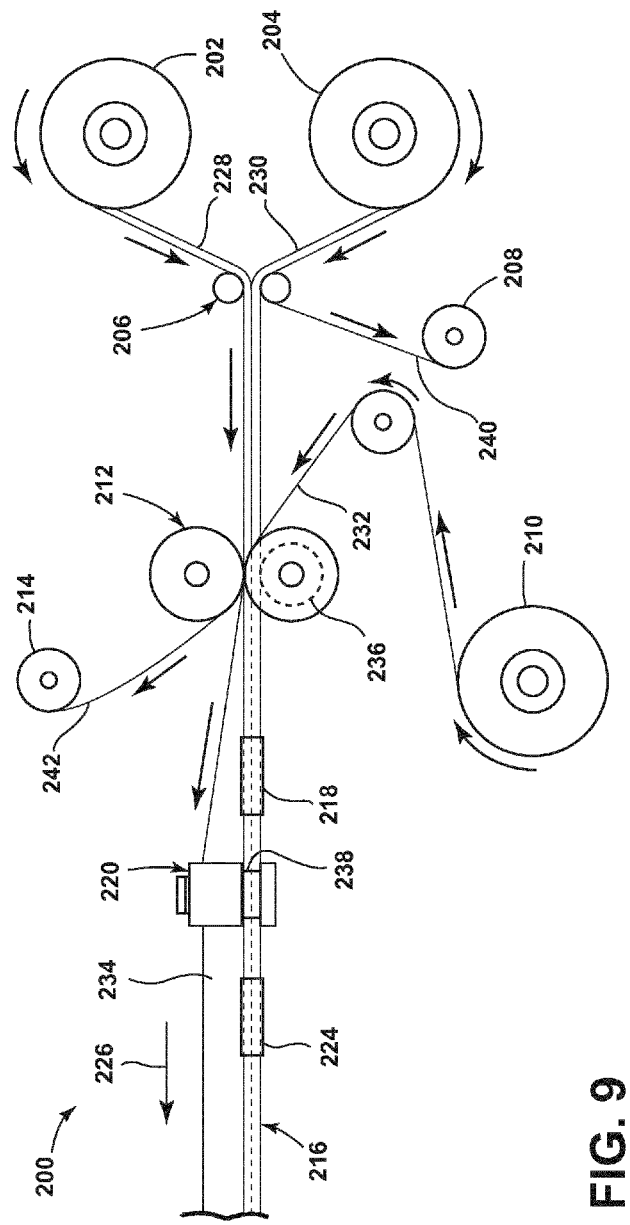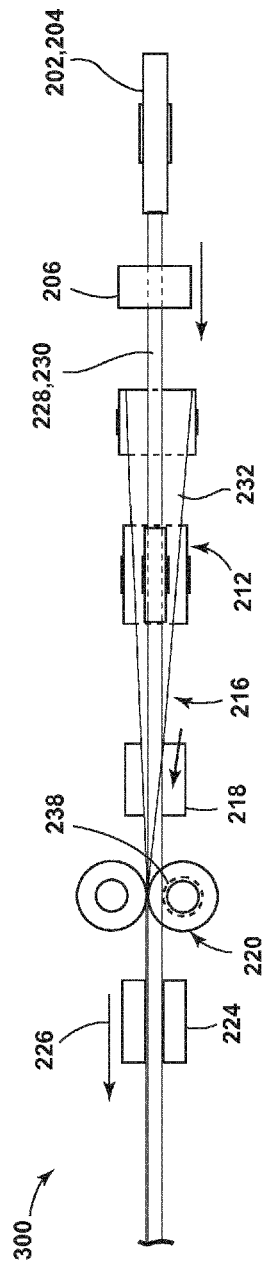

METHOD OF MAKING AN AIRDAM

BACKGROUND

In the manufacture of a composite work piece, the composite work piece undergoes a curing process to allow gasses and volatiles to escape. A common curing process involves drawing a vacuum around the composite work piece to draw out the gasses and volatiles. A vacuum bag that encompasses the composite work piece is used to form a vacuum chamber. When the vacuum is drawn, the bag contours to the work piece surfaces.

BRIEF DESCRIPTION

In one aspect, the present application discloses a method of making an airdam including a laminate to be placed along the edge of a composite work piece during a curing process. The method includes forming a strip from a supply of peel ply, forming a strip from a supply of tacky putty and automatically affixing the strip of tacky putty to the strip of peel ply without human assistance to form the laminate including at least one layer of peel ply and at least one layer of tacky putty.

BRIEF DESCRIPTION OF THE DRAWINGS

In the drawings:

FIG. 2 is a sectional view of a composite work piece after a curing process using a vacuum bag and without an airdam.

FIG. 3 is a sectional view of a composite work piece and an airdam after a curing process using a vacuum bag.

FIG. 4 is a top view of a composite work piece and an airdam with a non-straight edge after a curing process.

FIG. 5 shows a sectional view of a composite work piece and an airdam that is not straight along its length.

FIG. 6 shows sectional views of an airdam according to an embodiment of the innovation.

FIG. 7 shows sectional views of an airdam according to another embodiment of the innovation.

FIG. 9 shows a schematic view of a payout and lamination method of making an airdam according to an embodiment of the innovation.

FIG. 10 shows the top view of the payout and lamination method of making an airdam of FIG. 8.

DETAILED DESCRIPTION

Figure 1:
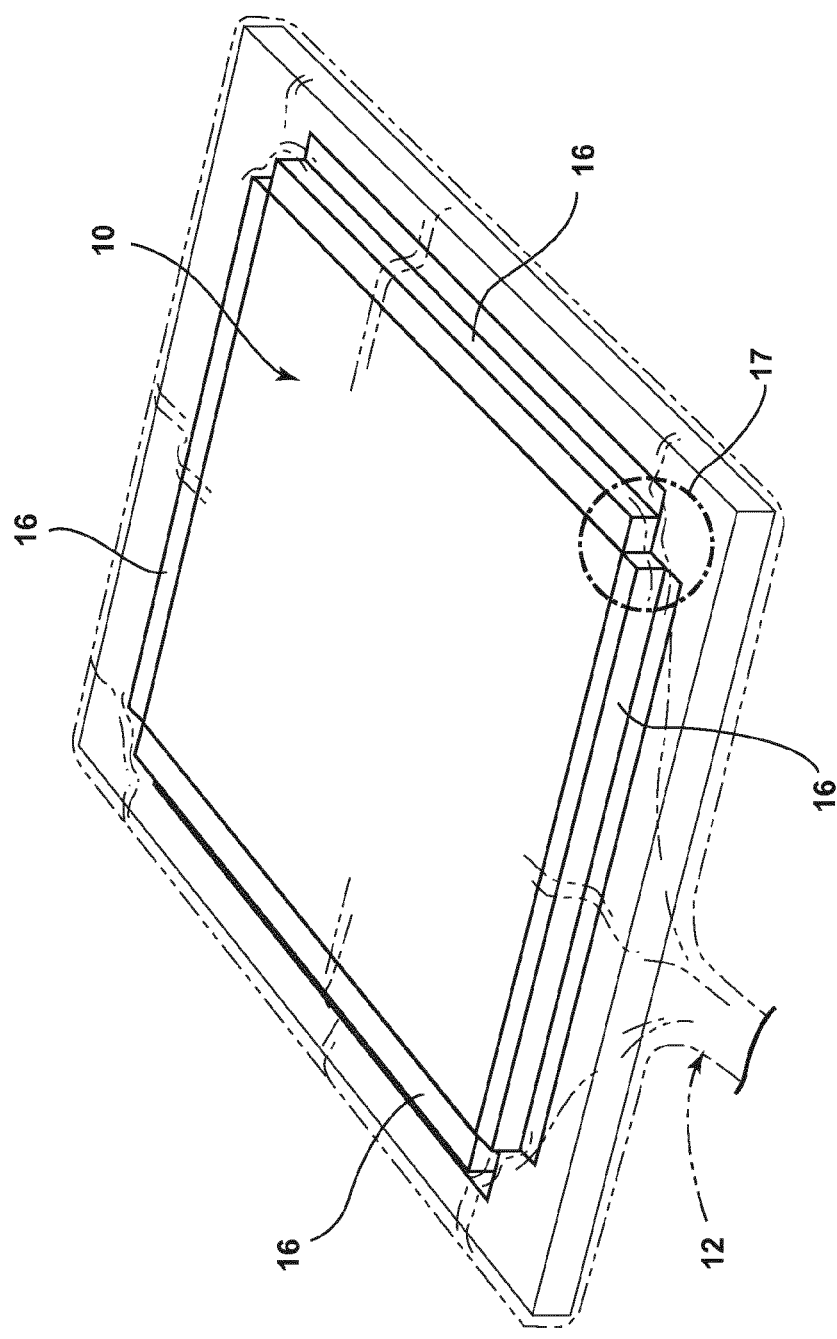
FIG. 1 shows a perspective view of a composite work piece during a curing process using a vacuum bag with an airdam.

Referring now to the drawings and to FIG. 1 in particular, there is shown a composite work piece 10 during a curing process. The composite work piece 10 includes layers of composite materials such as carbon fiber, impregnated with a resin such as an epoxy. During manufacturing, the composite work piece 10 must undergo a curing process which involves a vacuum bagging process. The vacuum bagging process imparts pressure on the composite work piece 10 to provide good consolidation and interlaminar bonds and draws a vacuum to draw out volatiles and trapped air, resulting in a low void content. A vacuum bag 12 encompasses the composite work piece 10 to form the vacuum chamber. Airdams 16 surround the composite work piece 10 at the edge portion 17 to aid in holding the perimeter shape of the composite work piece 10.

FIGS. 2, 3 and 5 shows the edge portion 17 of a composite work piece 10 after a curing process. FIG. 2 shows the edge portion 17 of a composite work piece 10 without an airdam. A vacuum bag 12 encompasses the composite work piece 10. As a vacuum force is drawn, the vacuum bag 12 is drawn against the composite work piece 10 and the force of the vacuum applied by the vacuum bag 12 may deform the original composite work piece shape 14 (shown in dashed lines) from a rectangular edge cross section to a sloped or partially rounded cross section when cured. Such deformation of the edge portion makes it difficult to assemble two such composite work pieces 10 in abutting relationship, which is common when the composite work pieces 10 are panels, such as composite panels or skins for an aircraft. To eliminate the sloping or rounding of the edge portion, an airdam 16 is placed against the composite work piece 10 as shown in FIG. 3. The force of the vacuum applied by the vacuum bag 12 acts on the airdam 16 and may deform the original airdam shape 18 instead of the composite work piece 10. The use of the airdam 16 solves the problem of the sloping edge portion.

However, the airdam 16 introduces its own problems into the process because the edge portion 17 of the composite work piece 10 will tend to conform to the shape of the airdam 16 as shown in FIG. 4 or be deformed by the force of the vacuum bag as shown in FIG. 5. If the airdam 16 is not straight and/or square, neither will be the portion of the composite work piece 10 adjacent the airdam 16. For example, when the airdam 16 has a portion of a working edge 20 abutting the composite work piece 10 which is not straight or square as shown in FIG. 5, a gap 22 may be formed between the original composite work piece shape 14 and the airdam 16. As a vacuum is drawn, the vacuum bag 12 is drawn against the composite work piece 10 and the force of the vacuum applied by the vacuum bag 12 may deform the original composite work piece shape 14 as well as the original airdam shape 18. Furthermore, when the length of the airdam 16 is not straight as shown in FIG. 4, a gap 24 may be formed between the composite work piece 10 and the airdam 16 causing similar deformation to the composite work piece 10 as shown in FIG. 5 and described above. In the context of composite panels that are arranged in abutting relationship, a non-straight edge portion 17 makes it impossible to assemble adjacent panels. Thus, the edge portions 17 will require finishing for straightening after the curing process, which is very time-consuming and costly.

FIG. 6 illustrates an airdam 25 according to an embodiment. The airdam 25 has straight edges and is linear, which, when abutted against a composite work piece 10 will form the desired shape for the edge portion of the composite work piece 10. The airdam 25 includes a laminate of tacky putty 26 and peel ply 28. The laminate includes one layer of a strip of peel ply 28 and one layer of a strip of tacky putty 26. The strip of peel ply 28 is wrapped around a strip of tacky putty 26 forming overlapping ends 30. When an edge of the strips of peel ply 28 and tacky putty 26 align when the strips are affixed together, a working edge 32 is formed that is used to abut an edge of a composite work piece 10. The tacky putty 26 is a soft malleable material which may have enough tack to affix to the peel ply 28 and the peel ply 28 is an open woven breathable material.

In another embodiment of an airdam 27 as shown in FIG. 7, the airdam 27 includes a laminate of a tacky putty 26 and peel ply 28 where the laminate includes one layer of a strip of peel ply and two layers of a strip of tacky putty 26. The strip of peel ply 28 is wrapped around the two strips of tacky putty 26 forming overlapping ends 30. When an edge of the strips of peel ply 28 and tacky putty 26 align when the strips are affixed together, a working edge 34 is formed that is used to abut an edge of the composite work piece 10.

Referring now to FIGS. 6 and 7, it will be understood that an airdam 25, 27 includes at least one layer of strip of peel ply 28 and at least one layer of strip of tacky putty 26 wherein the number of strips of tacky putty 26 is chosen to match the thickness of the of the composite work piece edge that the airdam working edge 32, 34 will abut.

When a working edge 32, 34 of an airdam 25, 27 is placed against a composite work piece 10 during a vacuum bag curing process as described above, the peel ply 28 along the working edge 32, 34 abutting with the composite work piece edge allows gases and volatiles to be drawn out due to the breathable quality of the material and the tacky putty absorbs the force of the vacuum bag acting along the composite work piece edge due to the malleable quality of the material.

Referring again to FIGS. 4 and 5, any force applied to the airdam 16 may deform the airdam 16 due to the malleable quality of the tacky putty resulting in an airdam 16 that is not straight and/or square. Previous airdams 16 were made by hand. The degree of straightness of the airdam 16 varied with the degree of skill of the person making the airdam 16, with no person being perfect. When an airdam 16 is made by hand, the straightness along the working edge and the straightness along the length is only as good as the skill of the person making the airdam 16 which results in a non-repeatable curing process and in a deformed composite work piece 10 as shown in FIGS. 4 and 5 and described above.

By automating the process of manufacturing, an airdam 25, 27 shown in FIGS. 6 and 7 may be made without human assistance. This allows for a repeatable method of making an airdam 25, 27 that is straight along the length and that has a straight or square working edge 32, 34.

Figure 8:
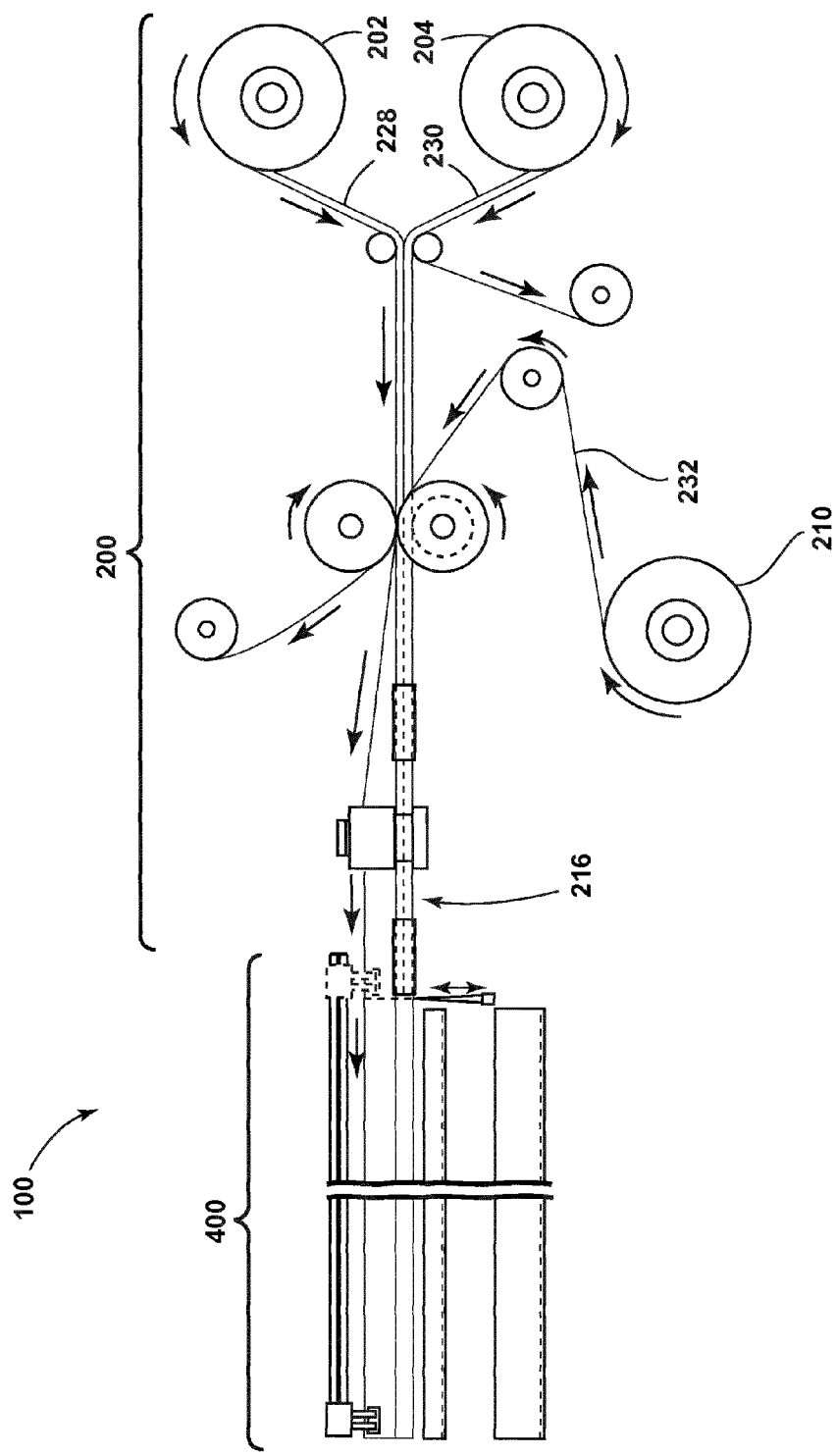
FIG. 8 shows a schematic view of a method of making an airdam according to an embodiment of the innovation.

FIG. 8 shows a schematic view of a machine 100 for making an airdam without human assistance. The machine 100 includes a payout and lamination station 200 and a meter, cut to length and material handling station 400.

The machine 100 forms a strip of peel ply 232 from a supply of peel ply on the peel ply supply payout 210 and forms a strip of tacky putty 228, 230 from a supply of tacky putty on the tacky putty supply roll payout 202, 204. The strips are automatically affixed together to form the laminate as described above. The payout and lamination station 200 supplies material for the airdam and forms an airdam web 216. The meter, cut to length and material handling station 400 meters the materials and airdam web 216, cuts the airdam web 216 to a desired length and transfers the cut airdam to storage.

Turning now to FIG. 9, there is shown a schematic view of the payout and lamination station 200. The payout and lamination station 200 includes two tacky putty supply roll payouts 202, 204, lamination rollers 206, tacky putty backing rewinds 208, 214, a peel ply supply roll payout 210, horizontal axis forming rollers 212, forming blocks 218, 224, and vertical axis forming rollers 220. The horizontal axis forming rollers 212 has a recessed portion 236 in the lower roller. The vertical axis forming rollers 220 have one roller with a recessed portion 238. Each forming block 218, 224 includes two rectangular blocks spaced apart to form a substantially rectangular channel. It will be understood that the payouts, rewinds and rollers may include features well known in the art of web handling such as tension controls, pressure controls, servo controls and drive mechanisms.

The payout and lamination station 200 forms an airdam web 216 by supplying and forming material in a way indicated by the arrows 226. Two strips of tacky putty 228, 230 are unrolled from the two tacky putty supply roll payouts 202, 204 and pass through lamination rollers 206. The lamination rollers 206 affix the two strips of tacky putty 228, 230 together without deforming the strips of tacky putty 228, 230. Backing material 240 on the lower strip of tacky putty 230 present to prevent the strip of tacky putty 230 from adhering to itself when in roll form is separated from the strip of tacky putty strip 230 and rewound onto the tacky putty backing rewind 208. A strip of peel ply 232 is unrolled from the peel ply supply roll payout 210 and is introduced under the two strips of tacky putty 228, 230 at the horizontal axis forming rollers 212.

The horizontal axis forming rollers 212 has a recessed portion 236 in the lower roller with a depth and width that substantially correspond to the width and thickness of the two strips of tacky putty 228, 230 after the lamination roller 206. The horizontal axis forming rollers 212 affix the two strips of tacky putty 228, 230 to the strip of peel ply 232 without deforming the strips of tacky putty 228, 230. The strip of peel ply 232 conforms to horizontal and vertical sides of the recessed portion 236 to at least partially affix the strip of peel ply 232 to the lower horizontal and vertical sides of the strips of tacky putty 228, 230 respectively. The excess material of the strip of peel ply 232 not affixed to the two strips of tacky putty 228, 230 is oriented in both the horizontal and vertical direction.

After the horizontal axis forming rollers 212, backing material 242 on the upper strip of tacky putty 228 present to prevent the strip of tacky putty 228 from adhering to itself when in roll form is separated from the strip of tacky putty 228 and rewound onto the tacky putty backing rewind 214.

The lamination including the two strips of tacky putty 228, 230 and the strip of peel ply 232 passes through the channel of the forming block 218 that has a width and depth that substantially corresponds to the width and thickness of the two strips of tacky putty 228, 230 after the lamination roller 206. The horizontal and vertical sides of the channel affix the strip of peel ply 232 to the lower horizontal and vertical sides of the two strips of tacky putty 228, 230 respectively without deforming the two trips of tacky putty 228, 230. The excess material of strip of peel ply 232 not affixed to the two strips of tacky putty 228, 230 is oriented in substantially the vertical direction.

The lamination passes through vertical axis forming rollers 220 with a recessed portion 238 having a width and a depth corresponding to the width and thickness of the two strips of tacky putty 228, 230 after the lamination rollers 206. The strip of peel ply 232 conforms to horizontal and vertical sides of the recessed portion 238 to at least partially affix the strip of peel ply 232 to the upper horizontal and vertical sides of the strips of tacky putty 228, 230 respectively. The excess material of strip of peel ply 232 not affixed to the two strips of tacky putty is oriented in a vertical direction between the non-recessed portion of the vertical axis forming rollers 220 forming overlapping ends 234 completing the airdam web 216. The aligned edges of the strip of peel ply 232 and the edges of the strips of tacky putty 228, 230 when the strip of peel ply 232 and the strips of tacky putty 228, 230 are affixed to form a laminate, form at least one straight working edge that is to be used to abut an edge of a composite work piece during a curing process as described above.

The second forming block 224 is substantially similar to the first forming block 218 as described above. The forming block 224 also acts to stabilize and support the airdam web 216 for subsequent operations described herein after.

The top view of the payout and lamination station 200 shown in FIG. 10 has portions of the station removed for clarity. Viewed from above, it can be seen that the horizontal forming rollers 212 begin the process of affixing the strip of peel ply 232 to the sides of the two strips of tacky putty 228, 230 and the vertical forming rollers 220 complete the process of affixing the strip of peel ply 232 to the sides of the two strips of tacky putty 228, 230. It can also be seen that at no point throughout the payout and lamination station 200 are the two strips of tacky putty 228, 230 permanently deformed.

Figure 11:
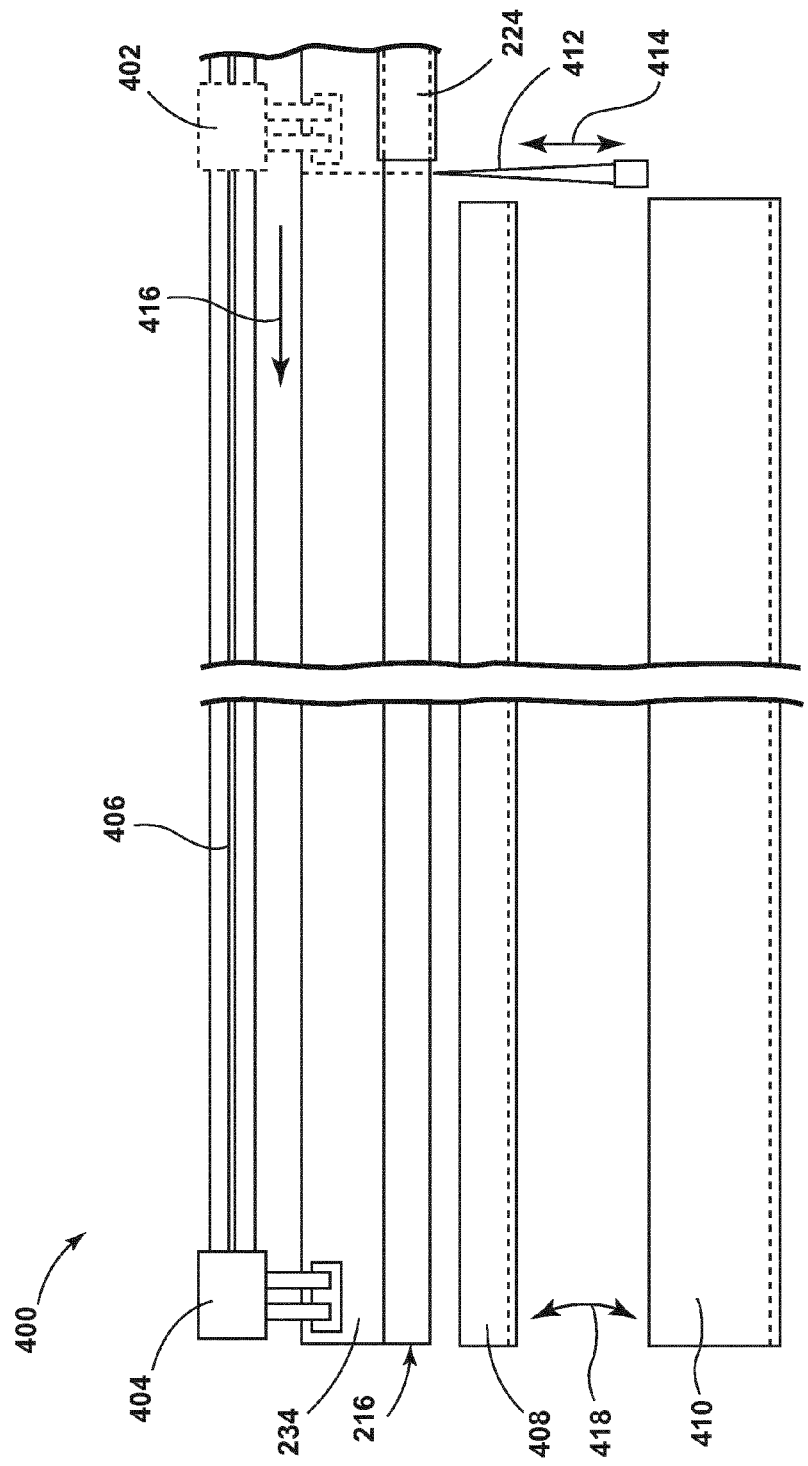
FIG. 11 shows a schematic view of a metering, cut to length and material handling method of a making an airdam according to an embodiment of the innovation.

FIG. 11 shows a schematic view of a meter, cut to length and material handling station 400. The meter, cut to length and material handling station 400 includes movable gripper 402, 404, a gripper guide rail 406, an actuating cutting device 412, a pivoting transfer trough 408 and an indexing storage trough 410.

The movable gripper 402, 404 is movable from a first position indicated by the movable gripper 402 to a second position indicated by the movable gripper 404 along the gripper guide rail 406. The actuating cutting device 412 may actuate in the vertical direction indicated by arrows 414 and may perform cutting methods including but not limited to shear cutting, die cutting or kiss cutting. The pivoting transfer trough 408 may pivot in a direction indicated by arrow 418. An indexing storage trough 410 may index in a direction perpendicular to both the arrow 414 and the direction of movement of the movable gripper 402, 404.

When in the first position, the movable gripper 402 grips the airdam web 216 by the overlapping ends 234 of the peel ply as it is stabilized and supported by the forming block 224. As the movable gripper 402, 404 moves to the second position, the airdam web is also moved as indicated by arrow 416. The movement of the airdam web 216 caused by the movable gripper 402, 404 forms more airdam web 216 as shown in FIGS. 8 and 9 and described above.

When in the second position, a portion of the airdam web 216 including the laminate of peel play and tacky putty is supported by the movable gripper 404 and the forming block 224 so as to prevent permanent deformation of the tacky putty. While being supported, the actuating cutting device 412 actuates in the vertical direction and cuts the airdam web 216 forming an airdam. The movable gripper 404 releases the overlapping ends 234 and the airdam is received by the pivoting transfer trough 408. The pivoting transfer trough 408 pivots downwards, dropping the airdam into an indexing storage trough 410. The movable gripper 402, 404 returns to the first position and the process is repeated. When an indexing storage trough 410 becomes full of airdams, it is indexed to introduce an empty indexing storage trough 410 for receiving subsequent airdams.

In one embodiment, the meter, cut to length and material handling station 400 may be configured to cut the airdam web 216 to form an airdam with a length less than two meters so as to be easily handled by a human during subsequent operations. However, it will be understood that the meter, cut to length and material handling station 400 may be configured to cut the airdam web 216 to form an airdam with any desired length. While the method of making an airdam has been described using one strip of peel ply and two strips of tacky putty, it will be understood that a substantially similar method applies to an airdam having one strip of tacky putty and one strip of peel ply. Referring again to FIG. 9, in the case that only one strip of tacky putty is desired, the payout and lamination station 200 could be easily modified by removing the tacky putty supply roll payout 204 and tacky putty backing rewind 208 and making the recessed portions 236, 238 substantially correspond to the width and thickness of the one strip of tacky putty 228.

The embodiments described above may provide for a variety of benefits including that a method of making an airdam according to the innovation allows for the repeatable manufacturing of airdams without deformation allowing for a more consistent curing process resulting in reduced scrap and higher quality composite work pieces. It may also reduce labor costs and increase efficiency by eliminating the need for human assistance during manufacturing.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims

What is claimed is:

1. A method of making a composite part, the method comprising:
    forming a strip of peel ply from a supply of peel ply;
    forming a strip of tacky putty from a supply of tacky putty;
    automatically affixing the strip of tacky putty to the strip of peel ply without human assistance to form a laminate comprising at least one layer of the strip of peel ply and at least one layer of a strip of tacky putty;
    placing the laminate against an edge of a composite work piece;
    placing the laminate and composite work piece in a vacuum bag so that the vacuum bag encompasses the composite work piece and laminate;
    drawing a vacuum within the vacuum bag; and
    curing the composite work piece.

2. The method of claim 1, wherein each of the strip of peel ply and the strip of tacky putty have one or more edges, wherein the one or more edges of the strip of peel ply and the one or more edges of the strip of tacky putty are aligned when the strips are affixed to form a working edge of the laminate that is to be used to abut an edge of the composite work piece.

3. The method of claim 2, wherein the affixing is done without permanently deforming the working edge.

4. The method of claim 3, wherein the without permanently deforming the working edge comprises providing a straight working edge.

5. The method of claim 1, wherein the affixing is done without permanently deforming the strip of tacky putty.

6. The method of claim 1, wherein forming a strip of peel ply from a supply of peel ply or forming a strip of tacky putty from a supply of tacky putty comprises separating at least one of the strips from a backing material.

7. The method of claim 6, wherein the supply of peel ply or the supply of tacky putty comprises a roll and the separating occurs during the unrolling of the strip.

8. The method of claim 7, further comprising cutting the at least one of the strips.

9. The method of claim 8, wherein the cutting the at least one of the strips comprises cutting the strip at a length less than 2 meters.

10. The method of claim 8, wherein cutting the at least one of the strips further comprises;
   moving the at least one of the strips from a first position to a second position using a movable gripper; and
   cutting the at least one of the strips using an actuating cutting device,
      wherein the actuating cutting device moves in a vertical direction, and
      wherein the movable gripper moves from a first position to a second position along one or more gripper guide rails.

11. The method of claim 10, wherein cutting the at least one of the strips comprises using a cutting device selected from at least one of shear cutting, die cutting and kiss cutting.

12. The method of claim 1, further comprising supporting the laminate to prevent permanent deformation of the tacky putty.

13. The method of claim 1, wherein the peel ply comprises an open woven breathable material.

14. The method of claim 1, wherein automatically affixing the strip of tacky putty to the strip of peel ply without human assistance to form the laminate further comprises;
   passing the laminate through one or more vertical axis forming rollers, the one or more vertical axis forming rollers comprising a recessed portion having a recess width and a recess depth corresponding to a width and a thickness of the strip of tacky putty.

15. A method of making a composite part, the method comprising:
   forming a composite work piece, the composite work piece comprising layers of composite materials;
   forming a strip of peel ply;
   forming a strip of tacky putty;
   automatically affixing the strip of tacky putty to the strip of peel ply without human assistance to form a laminate comprising at least one layer of the strip of peel ply and at least one layer of the strip of tacky putty;
   placing the laminate and an edge of the composite work piece together;
   placing the laminate and composite work piece in a vacuum bag so that the vacuum bag encompasses the composite work piece and laminate;
   drawing a vacuum within the vacuum bag; and
   curing the composite work piece while still encompassed within the vacuum bag,
      wherein placing the laminate and an edge of the composite work piece together comprises placing a working edge of the laminate so that it abuts with the edge of the composite work piece.

16. The method of claim 15, wherein the laminate is an airdam.

* * * * *